US011325414B2

(12) United States Patent
Taniguchi et al.

(10) Patent No.: US 11,325,414 B2
(45) Date of Patent: May 10, 2022

(54) TRANSFER SHEET AND DECORATIVE PRODUCT USING SAME

(71) Applicant: Nissha Co., Ltd., Kyoto (JP)

(72) Inventors: Chuzo Taniguchi, Kyoto (JP); Satoshi Wada, Kyoto (JP); Michiyasu Okuda, Kyoto (JP)

(73) Assignee: Nissha Co., Ltd., Tokyo (JP)

( * ) Notice: Subject to any disclaimer, the term of this patent is extended or adjusted under 35 U.S.C. 154(b) by 0 days.

(21) Appl. No.: 17/288,857

(22) PCT Filed: Aug. 28, 2019

(86) PCT No.: PCT/JP2019/033646
§ 371 (c)(1),
(2) Date: Apr. 26, 2021

(87) PCT Pub. No.: WO2020/084895
PCT Pub. Date: Apr. 30, 2020

(65) Prior Publication Data
US 2022/0001687 A1    Jan. 6, 2022

(30) Foreign Application Priority Data

Oct. 26, 2018 (JP) .............................. JP2018-201375

(51) Int. Cl.
B44C 1/17 (2006.01)
B32B 3/30 (2006.01)
(Continued)

(52) U.S. Cl.
CPC ............. *B44C 1/1708* (2013.01); *B32B 3/30* (2013.01); *B32B 7/06* (2013.01); *B32B 27/06* (2013.01);
(Continued)

(58) Field of Classification Search
CPC ............. Y10T 428/28; Y10T 428/2848; Y10T 428/2486; Y10T 428/24521; B44C 1/17; B44C 1/1708; G09F 3/02; G09F 2003/0225; G09F 2003/0226; B44F 1/02; B44F 1/08; B32B 3/30; B32B 7/06;
(Continued)

(56) References Cited

U.S. PATENT DOCUMENTS 5,413,839 A * 5/1995 Chatwin ............... B44C 1/1716
156/230

FOREIGN PATENT DOCUMENTS

JP    2003-288018    10/2003

* cited by examiner

*Primary Examiner* — Catherine A. Simone
(74) *Attorney, Agent, or Firm* — Thorpe North & Western

(57) ABSTRACT

A transfer sheet is configured to include a base sheet; a releasable layer laminated on the base sheet, containing an ultraviolet curing resin, and including minute irregularities on at least part of a surface opposite to a surface in contact with the base sheet; a peeling layer laminated entirely on the releasable layer; and a single color solid print layer laminated in a section on the peeling layer corresponding at least to a region where the minute irregularities of the releasable layer are formed. A maximum width W of a recessed portion of the minute irregularities and a depth D of the recessed portion of the minute irregularities satisfy $10 \leq W/D \leq 50$, $W \leq 100$ μm and $2\ \mu m \leq D \leq 10\ \mu m$. At least one of the number of recessed portions per unit area and the depth of the recessed portion changes stepwise.

7 Claims, 12 Drawing Sheets

(51) Int. Cl.
 *B32B 27/06* (2006.01)
 *B32B 7/06* (2019.01)
 *B44F 1/08* (2006.01)
 *B44F 1/02* (2006.01)

(52) U.S. Cl.
 CPC ............... *B44F 1/02* (2013.01); *B44F 1/08* (2013.01); *B32B 2307/4023* (2013.01); *B32B 2405/00* (2013.01); *B32B 2451/00* (2013.01)

(58) Field of Classification Search
 CPC ............ B32B 27/06; B32B 2307/4023; B32B 2405/00; B32B 2451/00
 USPC ............. 428/40.1, 41.8, 42.3, 161, 913, 914
 See application file for complete search history.

(a)

(c) ULTRAVIOLET RAY IRRADIATION (b)

(d)

(a)

(d)

(b)

(e)

(c)

(a)

DARK        LIGHT (b)

DARK        LIGHT (c)

DARK        LIGHT (a)

(b)

(a)

(b)

TRANSFER SHEET AND DECORATIVE PRODUCT USING SAME

CROSS REFERENCES TO RELATED APPLICATIONS

This application is a continuation of International Application No. PCT/JP2019/033646, filed on Aug. 28, 2019, which claims priority to Japanese Patent Application 2018-201375, filed on Oct. 26, 2018, which is incorporated herein by reference.

TECHNICAL FIELD

The present disclosure relates to transfer sheets and decorative products using the same.

BACKGROUND

As one of chassis designs of mobile terminals and the like, a design that uses colors with gradations can be cited. The gradation is reproduced by forming a print layer in a dotted pattern on a base substrate such as a film by photogravure, for example, and changing the number of dots per unit area and the size of the dots. For example, in Japan Unexamined Patent Publication No. 2003-288018, a label is disclosed in which a gradation print layer 11 formed in a dotted pattern, an adhesive agent layer 10, and a mount 13 are laminated in sequence on one surface of a label base substrate 9, and a light transmitting solid print layer 12 is laminated on the other surface thereof (see FIG. 12). The gradation is reproduced by changing the number of dots per unit area and the size of the dots. This label is used in such a manner that the mount 13 is peeled off to expose the adhesive agent layer 10 and then the label is used by pasting on an adherend. In this label, dots are not noticeable near the boundary between a region having a gradation and a region having no gradation, so that smooth gradation printing may be obtained.

However, when dots for constituting gradations are formed by printing as in Japan Unexamined Patent Publication No. 2003-288018, the dots blur in some case, which imposes limitations on forming the dots with high definition. In addition, because the outermost surface of the label is flat and smooth, there is a problem in that sebum (fingerprint) is likely to adhere to the label when the label is touched.

SUMMARY

The present disclosure provides a transfer sheet and a decorative product using the same, which are able to reproduce high definition gradations and to which fingerprints are unlikely to adhere.

Some aspects of the present disclosure will be described below. These aspects can be combined optionally, as needed.

A transfer sheet of the present disclosure includes:
a base sheet;
a releasable layer laminated on the base sheet, containing an ultraviolet curing resin, and including minute irregularities on at least part of a surface opposite to a surface in contact with the base sheet;
a peeling layer laminated entirely on the releasable layer; and
a single color solid print layer laminated in a section on the peeling layer corresponding at least to a region where the minute irregularities of the releasable layer are formed,
wherein in a case that a maximum width of a recessed portion of the minute irregularities is taken as W, and a depth of the recessed portion of the minute irregularities is taken as D, relations (1) and (2) given below are satisfied, $$10 \leq W/D \leq 50 \tag{1}$$

$$W \leq 100 \text{ μm}, 2 \text{ μm} \leq D \leq 10 \text{ μm} \tag{2), and}$$

at least one of the number of recessed portions per unit area and the depth of the recessed portion changes stepwise.

At least one of the number of recessed portions per unit area and the depth of the recessed portion may change stepwise in a portion to be transferred to a peripheral edge of a transfer target object.

An adhesive layer laminated entirely on the solid print layer may be further provided.

A decorative product of the present disclosure includes:
a transfer target object;
a single color solid print layer formed in a predetermined region on the transfer target object; and
a peeling layer formed on the solid print layer and including minute irregularities in a section corresponding to the region where the solid print layer is formed,
wherein in a case that a maximum width of a projected portion of the minute irregularities is taken as W, and a height of the projected portion of the minute irregularities is taken as H, relations (1) and (2) given below are satisfied, $$10 \leq W/H \leq 50 \tag{1}$$

$$W \leq 100 \text{ μm}, 2 \text{ μm} \leq H \leq 10 \text{ μm} \tag{2), and}$$

at least one of the number of projected portions per unit area and the height of the projected portion changes stepwise.

At least one of density of the projected portions and a depth of the projected portion may change stepwise in a peripheral edge portion of the transfer target object.

An adhesive layer formed between the transfer target object and the solid print layer may be further provided.

The transfer sheet of the present disclosure is configured to include a base sheet; a releasable layer laminated on the base sheet, containing an ultraviolet curing resin, and including minute irregularities on at least part of a surface opposite to a surface in contact with the base sheet; a peeling layer laminated entirely on the releasable layer; and a single color solid print layer laminated in a section on the peeling layer corresponding at least to a region where the minute irregularities of the releasable layer are formed. In a case that a maximum width of a recessed portion of the minute irregularities is taken as W, and a depth of the recessed portion of the minute irregularities is taken as D, relations (1) and (2) given below are satisfied, $$10 \leq W/D \leq 50 \tag{1}$$

$$W \leq 100 \text{ μm}, 2 \text{ μm} \leq D \leq 10 \text{ μm} \tag{2), and}$$

at least one of the number of recessed portions per unit area and the depth of the recessed portion changes stepwise.

Thus, the transfer sheet of the present disclosure is able to reproduce a high definition gradation, and a fingerprint is unlikely to adhere to the transfer sheet.

The decorative product of the present disclosure is configured to include a transfer target object; a single color solid print layer formed in a predetermined region on the transfer target object; and a peeling layer formed on the solid print layer and including minute irregularities in a section corresponding to the region where the solid print layer is formed. In a case that a maximum width of a projected portion of the minute irregularities is taken as W, and a height of the projected portion of the minute irregularities is taken as H, relations (1) and (2) given below are satisfied, $$10 \leq W/H \leq 50 \quad (1)$$

$$W \leq 100 \text{ μm}, 2 \text{ μm} \leq H \leq 10 \text{ μm} \quad (2), \text{ and}$$

at least one of the number of projected portions per unit area and the height of the projected portion changes stepwise.

Thus, the decorative product of the present disclosure is able to reproduce a high definition gradation, and a fingerprint is unlikely to adhere to the decorative product.

DETAILED DESCRIPTION

Figure 1:
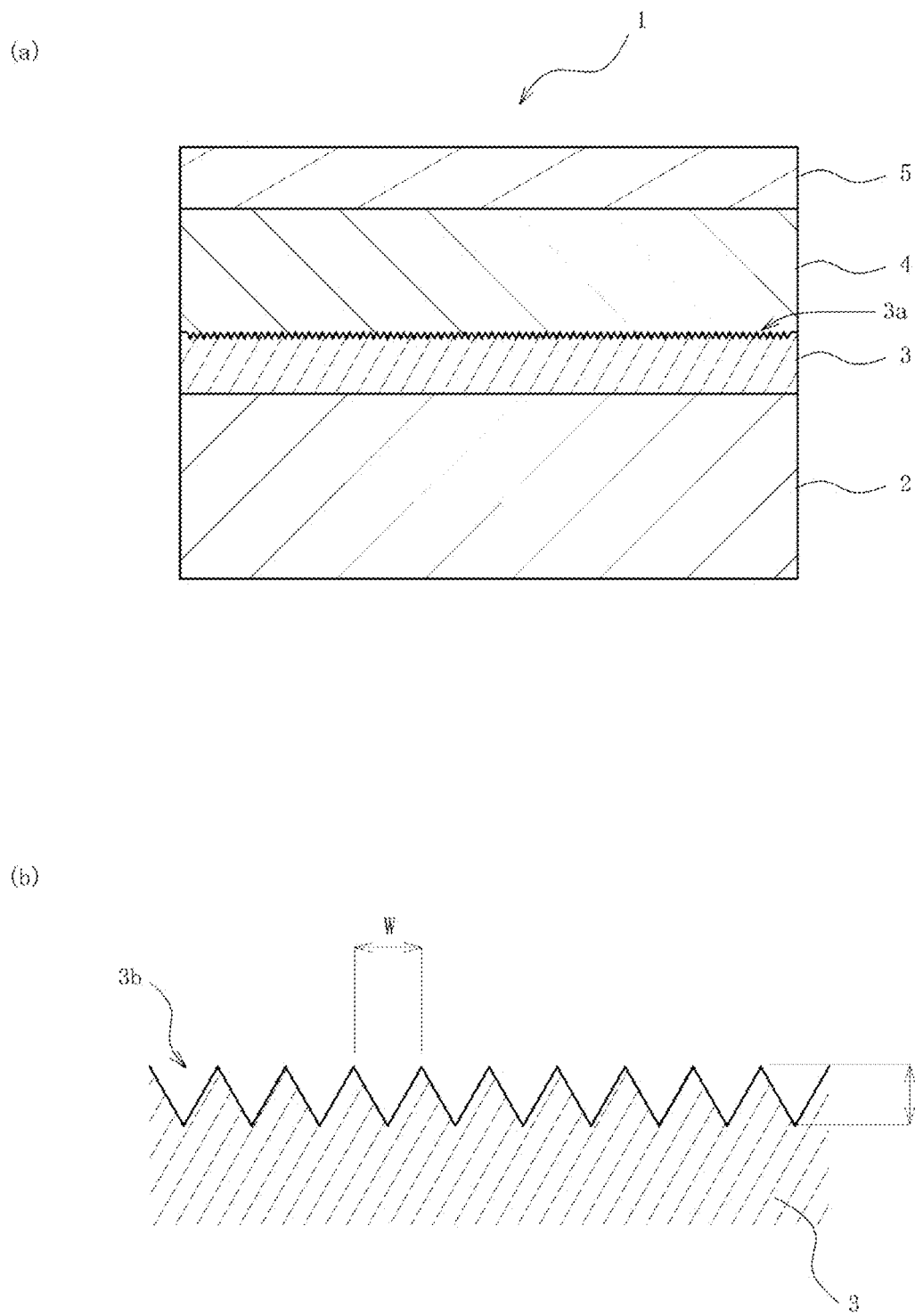
FIG. 1(a) is a schematic cross-sectional view illustrating an embodiment of a transfer sheet of the present disclosure.
FIG. 1(b) is a schematic enlarged view of minute irregularities.

Hereinafter, an example of an embodiment of a transfer sheet and a decorative product using the same of the present disclosure will be described with reference to the drawings.

Figure 5:
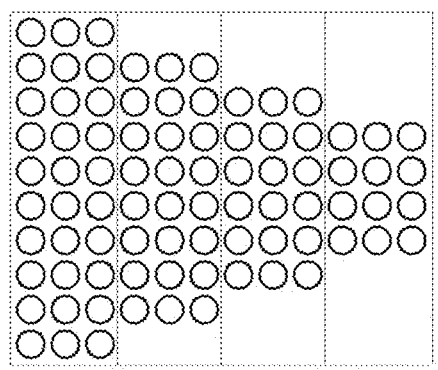
FIG. 5 includes schematic plan views each illustrating a relationship between a shape of minute irregularities and a gradation.
Figure 5:
Figure 5:
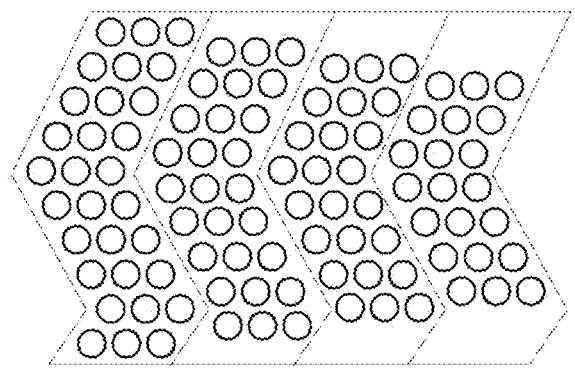
Figure 5:
Figure 5:
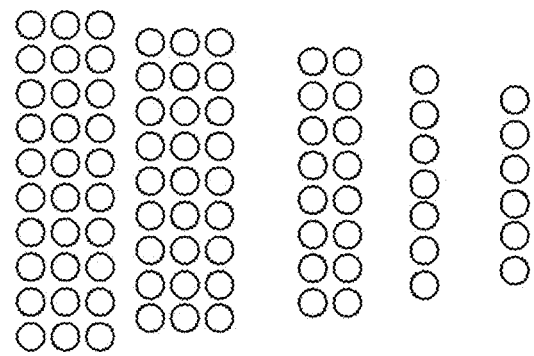
Figure 5:
Figure 6:
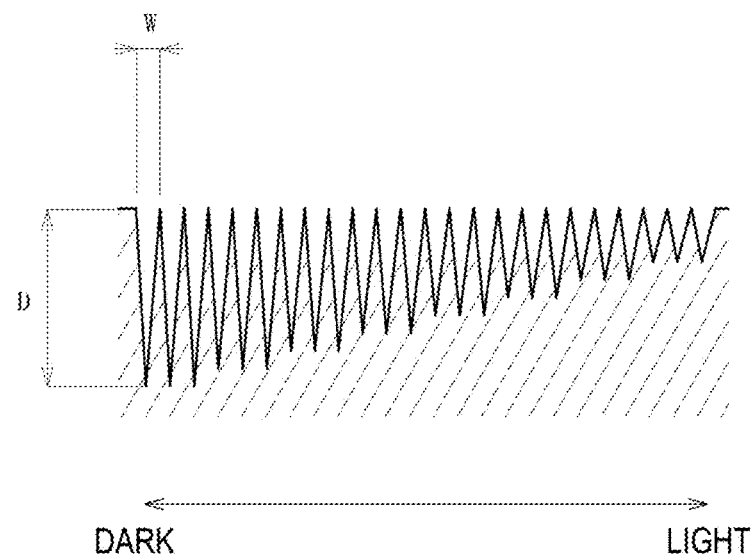
FIG. 6 includes schematic cross-sectional views each illustrating a relationship between a shape of minute irregularities and a gradation.
Figure 6:
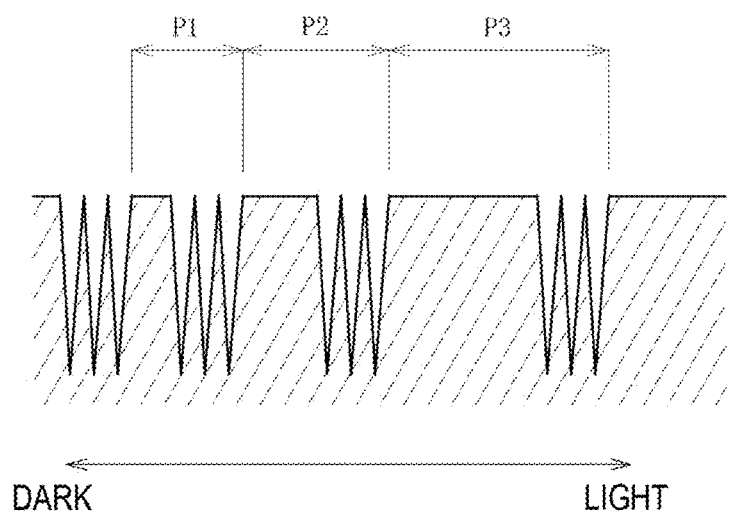

A transfer sheet 1 of the present disclosure includes a base sheet 2; a releasable layer 3 laminated on the base sheet, containing an ultraviolet curing resin, and including minute irregularities 3a on at least part of a surface opposite to a surface in contact with the base sheet; a peeling layer 4 laminated entirely on the releasable layer; and a single color solid print layer 5 laminated in a section on the peeling layer corresponding at least to a region where the minute irregularities of the releasable layer are formed. In a case that a maximum width of a recessed portion 3b of the minute irregularities is taken as W, and a depth of the recessed portion of the minute irregularities is taken as D, relations (1) and (2) given below are satisfied, $$10 \leq W/D \leq 50 \quad (1)$$

$$W \leq 100 \text{ μm}, 2 \text{ μm} \leq D \leq 10 \text{ μm} \quad (2), \text{ and}$$

at least one of the number of recessed portions 3b per unit area and the depth of the recessed portion changes stepwise (see FIGS. 1, 5, and 6).

After the transfer sheet 1 is transferred to the transfer target object, the base sheet 2 is peeled off from the transfer target object. Examples of a material of the base sheet 2 include thermoplastic resins, such as a polypropylene-based resin, polyethylene-based resin, polyamide-based resin, acrylic-based resin, olefin-based resin, polyester-based resin, vinyl chloride-based resin, polycarbonate-based resin, ABS (Acrylonitrile Butadiene Styrene)-based resin and the like, and laminated products of these resins.

When the base sheet 2 is peeled off from the transfer target object, the releasable layer 3 is peeled off therefrom along with the base sheet 2. The material of the releasable layer is resin containing an ultraviolet light curing resin. The ultraviolet light curing resin having a releasable property against the peeling layer 4 is used. The releasable layer 3 includes the minute irregularities 3a on a surface opposite to a surface in contact with the base sheet 2, in other words, on at least part of a boundary surface with the peeling layer 4 (to be described below) (see FIG. 8). The shape of the minute irregularities 3a is such that the maximum width W and the depth D of the recessed portion 3b satisfy the following two formulae:

$$10 \leq W/D \leq 50 \quad (1)$$

$$W \leq 100 \text{ μm}, 2 \text{ μm} \leq D \leq 10 \text{ μm} \quad (2).$$

In addition, at least one of the number of recessed portions 3b per unit area and the depth of the recessed portion 3b changes stepwise. As a result, a gradation can be applied to the single color solid print layer 5.

Figure 2:
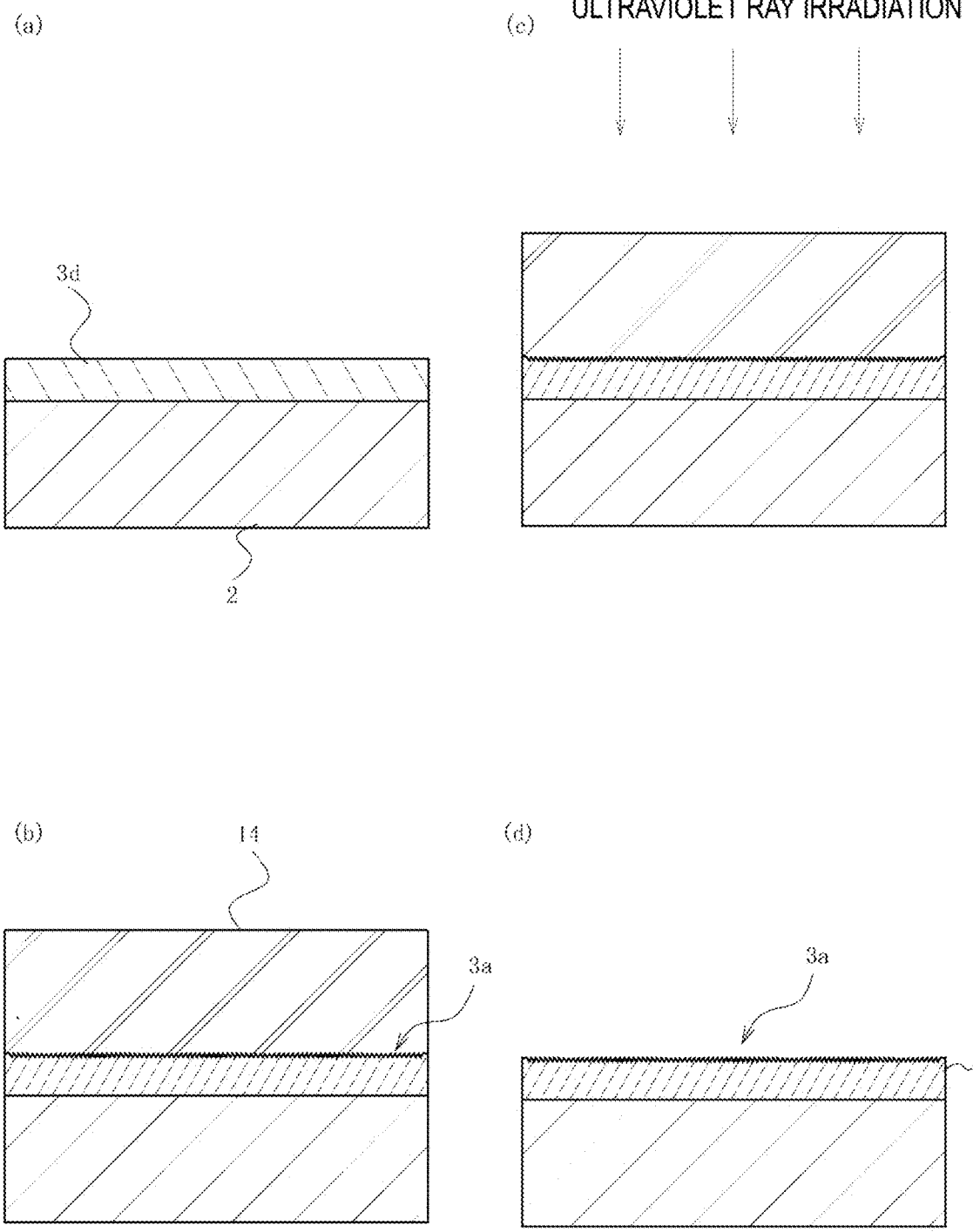
FIG. 2 includes schematic cross-sectional views illustrating an example of a releasable layer formation method.
Figure 3:
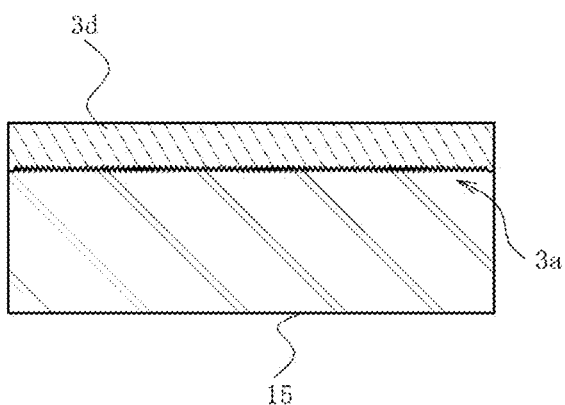
FIG. 3 includes schematic cross-sectional views illustrating an example of a releasable layer formation method.
Figure 3:
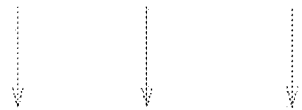
Figure 3:
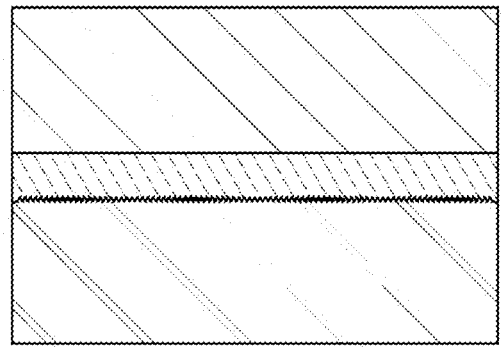
Figure 3:
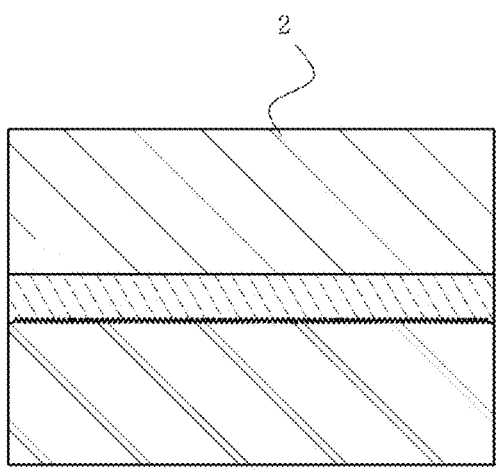
Figure 3:
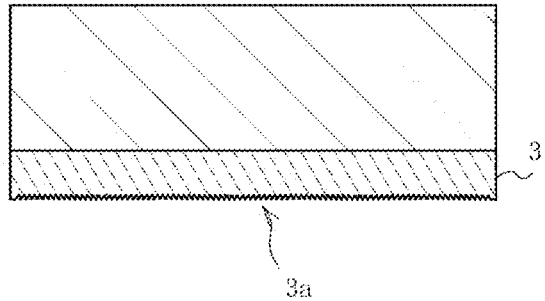

The method of forming the releasable layer is not particularly limited, and any of the following two methods can be used, for example. The first method will be described below. First, resin containing the ultraviolet curing resin is applied to the base sheet 2 (see FIG. 2(a)). Subsequently, a stamper having a shape obtained by inverting the shape of the minute irregularities 3a is laminated (see FIG. 2(b)), and in this state, ultraviolet rays are irradiated to cure the resin (see FIG. 2(c)). Finally, the stamper is removed, and the releasable layer 3 having the minute irregularities 3a is formed on the base sheet 2 (see FIG. 2(d)). Next, the second method will be described below. First, resin 3d containing the ultraviolet curing resin is applied to a metal plate 15, on which the minute irregularities 3a are formed (see FIG. 3(a)). Subsequently, the base sheet 2 is pasted onto the resin 3d (see FIG. 3(b)), and in this state, the ultraviolet rays are irradiated to cure the resin (see FIG. 3(c)). Finally, the base sheet 2, on which the releasable layer 3 having the minute irregularities 3a is formed, is obtained by being peeled off from the metal plate 15 (see FIG. 3(d)).

Figure 4:
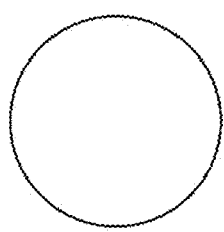
FIG. 4 includes schematic plan views each illustrating an example of a shape of a recessed portion.
Figure 4:
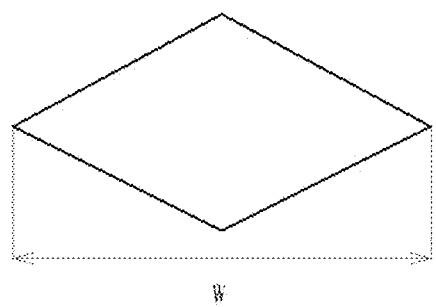
Figure 4:
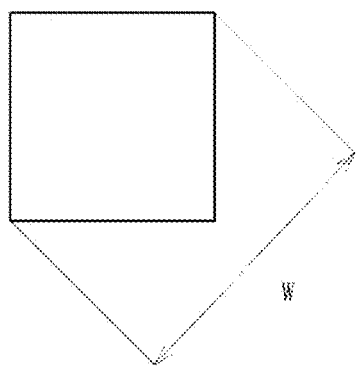
Figure 4:
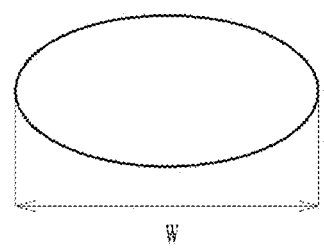
Figure 4:
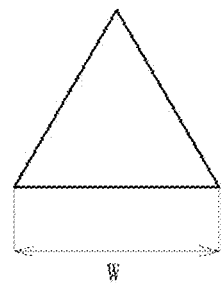

FIG. 4 illustrates examples of the shape of the recessed portion 3b in a plan view. As depicted in the drawings, the shape may be circular, rectangular, triangular, rhombic, oval, and the like. FIG. 5 illustrates examples in each of which the number of recessed portions per unit area changes stepwise. In any of the drawings, the number of recessed portions per unit area decreases stepwise toward the right side of the drawing. When the number of recessed portions per unit area decreases stepwise, the color of the solid print layer 5 becomes lighter stepwise, which makes it possible to apply a gradation even to the single color solid print layer 5. FIG. 6(a) illustrates an example in which the depth of a recessed portion changes stepwise. Toward the right side of the drawing, a depth D becomes shallower stepwise, while a maximum width W is constant. When the depth becomes shallower stepwise, the color of the solid print layer 5 becomes lighter stepwise, which makes it possible to apply a gradation even to the single color solid print layer 5.

Figure 7:
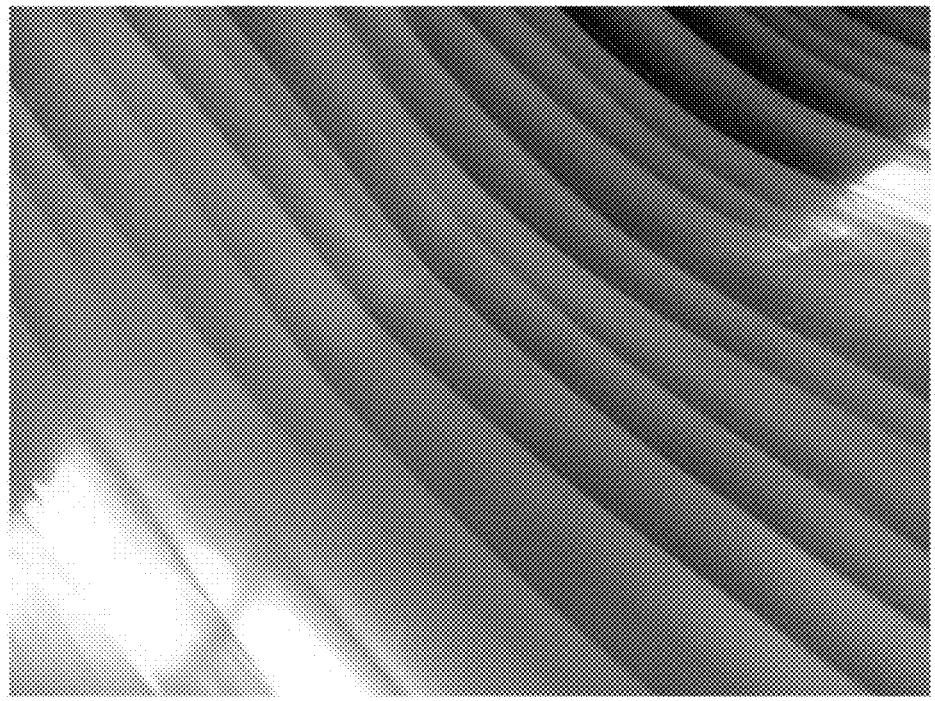
FIG. 7(a) is a photograph in a plan view showing an example of a base sheet in which a releasable layer having minute irregularities is formed.
FIG. 7(b) is a partially enlarged photograph of the photograph in FIG. 7(a).
Figure 7:
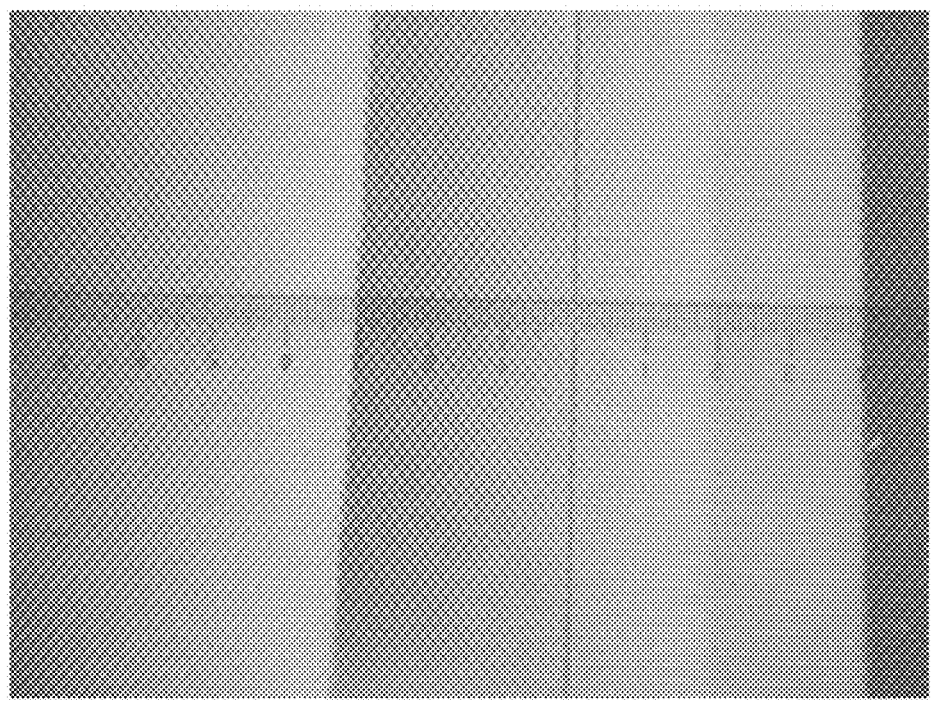

FIG. 7(a) is a photograph showing an example of the base sheet 2, on which the releasable layer 3 having the minute irregularities 3a is formed. Note that a solid print layer is not formed although a black color is seen in the photograph. With the minute irregularities 3a of the releasable layer, a high definition gradation is applied to the base sheet, and the shape of the minute irregularities 3a is also inverted and formed on a surface (peeling layer) of a decorative product. In other words, the high definition gradation as in FIG. 7(a) is applied to the decorative product. When part of FIG. 7(a) is enlarged, the gradation becomes lighter stepwise toward the right side of the photograph (see FIG. 7(b)). The shape of the minute irregularities 3a is a shape in which the depth D and the maximum width W of the recessed portion change stepwise. The depth D becomes shallower stepwise toward the right side of the drawing, and the maximum width W decreases stepwise toward the right side thereof.

Figure 9:
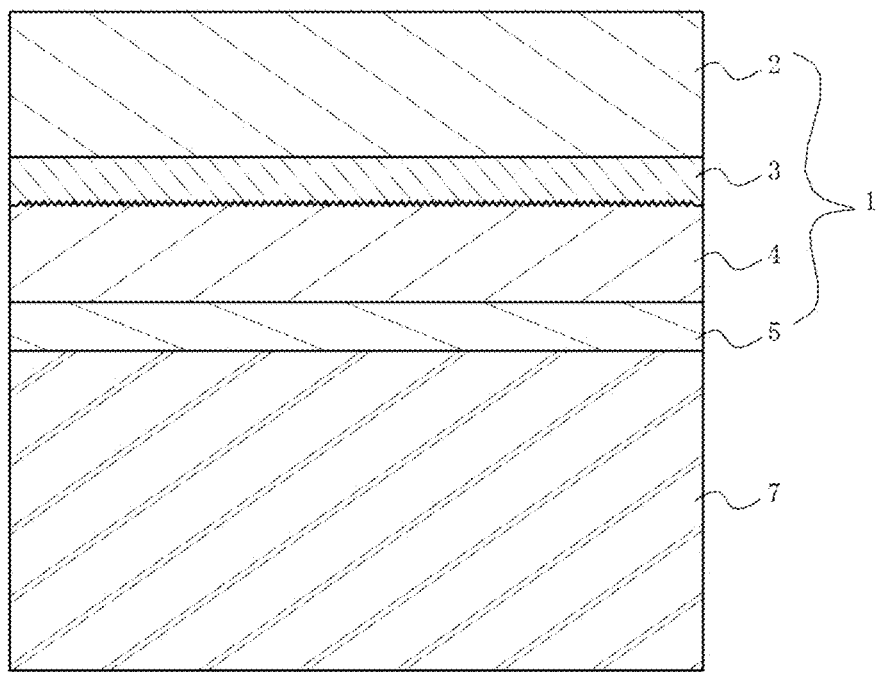
FIG. 9 includes schematic cross-sectional views illustrating an embodiment of a decorative product of the present disclosure.
Figure 9:
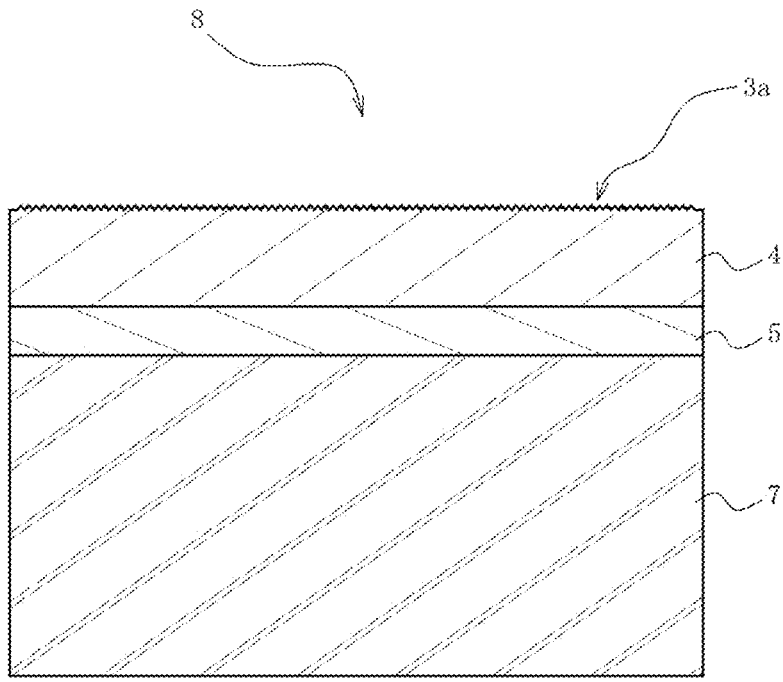

When the transfer sheet 1 is transferred to a transfer target object 7, the shape of the minute irregularities 3a of the releasable layer 3 is inverted on the surface of the peeling layer 4. In other words, the minute irregularities 3a are formed on a surface of a decorative product 8 (see FIG. 9). Accordingly, the depth D of the recessed portion of the minute irregularities of the releasable layer is a height H of a projected portion of minute irregularities on the surface of the decorative product. At this time, when the maximum width W exceeds 100 μm, fingerprints are easily attached to the surface (peeling layer 4) of the decorative product 8. In addition, the minute irregularities are easily shaved. When the depth D is less than 2 μm, fingerprints are easily attached to the surface of the decorative product 8. Furthermore, a matte feeling that can be imparted to the solid print layer 5 is reduced. When the depth D exceeds 10 μm, there may arise a risk that the minute irregularities 3a are difficult to be processed, the base sheet 2 is unlikely to be peeled at the time of transfer, or the like. In addition, since the maximum width W of the recessed portion of the minute irregularities is widened, fingerprints are easily attached to the surface of the decorative product.

Note that the number of recessed portions per unit area and an interval (pitch) between the recessed portions may change stepwise (see FIG. 5(c)). As in the drawing, when the number of recessed portions per unit area decreases stepwise and the pitch becomes larger stepwise toward the right side, the color of the solid print layer 5 becomes lighter stepwise. As a result, a gradation can be applied even to the single color solid print layer 5. The pitch may change stepwise, while the maximum width W and the depth D of the recessed portion are constant (see FIG. 6(b)). As in the drawing, when the pitch becomes larger stepwise in a relation of P1<P2<P3 toward the right side, the color of the solid print layer 5 becomes lighter stepwise. As a result, a gradation can be applied even to the single color solid print layer 5.

The peeling layer 4 is a layer to become the outermost surface of the decorative product 8 after the base sheet 2 is peeled off. A shape of irregularities obtained by inverting the shape of the minute irregularities 3a formed on the releasable layer 3 is formed on the surface of the peeling layer 4 exposed by peeling off the base sheet 2 (see FIG. 9(b)). As a material of the peeling layer, thermoplastic resins, such as an acrylic-based resin, polystyrene-based resin, polyamide-based resin, chlorinated polyolefin resin, chlorinated ethylene-vinyl acetate copolymer resin, cyclized rubber, coumarone-indene resin and the like, can be used. When the peeling layer is formed by such a thermoplastic resin, chemical resistance and the like may be imparted to the decorative product 8. The peeling layer may be formed by containing any of a photo-curing resin such as an ultraviolet curing resin, a radiation curing resin such as an electron beam curing resin, and a thermosetting resin as another material thereof. Examples of these resins include a urethane acrylate-based resin, cyanoacrylate-based resin, epoxy acrylate-based resin, polyester acrylate-based resin, and resins in which additives such as isocyanate are added to these resins. When the peeling layer is formed by the aforementioned curing resin, physical properties such as durability, wear resistance and the like may be imparted to the decorative product 8. The thickness of the peeling layer 4 may be 0.5 μm to 50 μm. It is preferably to be 0.5 μm to 20 μm.

The solid print layer 5 is formed in a section on the peeling layer 4 corresponding at least to a region where the minute irregularities 3a of the releasable layer 3 are formed. That is, when the minute irregularities 3a are formed on the entire surface of the releasable layer 3, the solid print layer 5 is also formed on the entire surface of the peeling layer (see FIGS. 1(a) and 8(a)). In a case where the minute irregularities 3a are formed on part of the releasable layer 3, the solid print layer 5 may be formed only in a region where the minute irregularities 3a are formed (see FIG. 10(b)), or may be formed including even a surface where no minute irregularities 3a are formed (see FIGS. 8(b) and (c)). The solid print layer 5 is formed with a single color. The materials of the solid print layer 5 are, for example, a resin such as an acrylic-based resin, a vinyl chloride vinyl acetate copolymer resin, a thermoplastic or thermosetting urethane-based resin, polyester-based resin or the like, and a material containing a pigment or dye that is added to the resin. The solid print layer 5 may be formed with a thickness in a range from several hundred nanometers to several tens of micrometers, for example.

Note that there may be printing such as a logo, for example, in a section where no minute irregularities are formed.

When the transfer sheet 1 is transferred to the transfer target object 7, a high definition gradation can be applied to the single color solid print layer 5 in accordance with the shape of the minute irregularities 3a above the solid print layer 5. Furthermore, a matte feeling can be imparted to the solid print layer 5 by the minute irregularities 3a. The transfer sheet has a shape of minute irregularities to which fingerprints are unlikely to be attached, which makes it possible to maintain the matte feeling.

Figure 10:
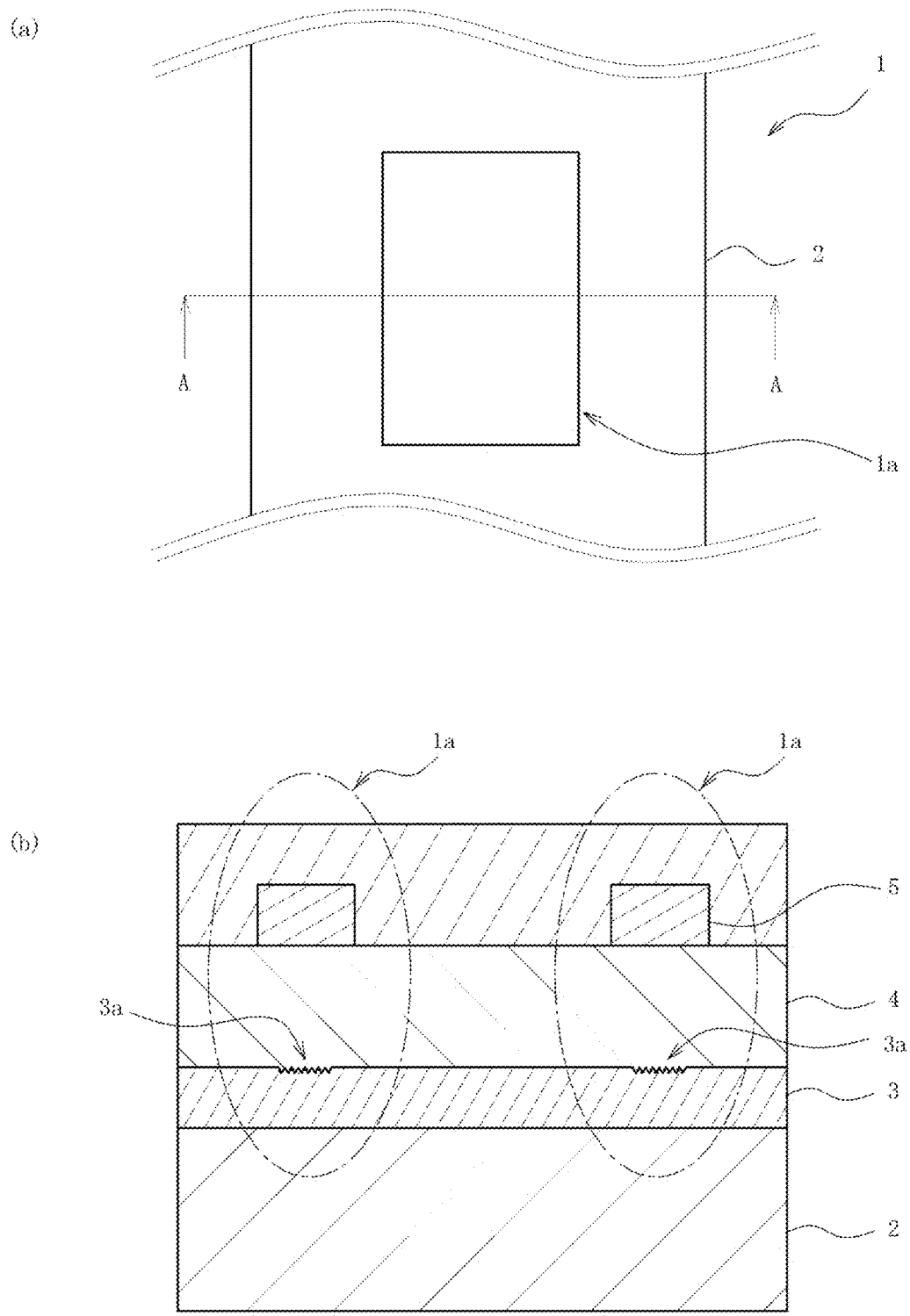
FIG. 10(a) is a schematic plan view illustrating another example of a transfer sheet of the present disclosure.
FIG. 10(b) is a cross-sectional view taken along a line A-A in FIG. 10(a).
Figure 11:
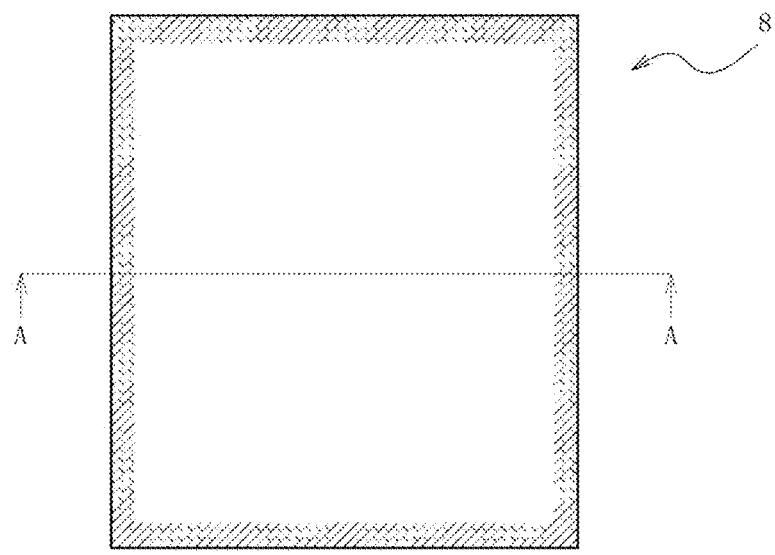
FIG. 11(a) is a schematic plan view illustrating another example of a decorative product of the present disclosure.
FIG. 11(b) is a cross-sectional view taken along a line A-A in FIG. 11(a).
Figure 11:
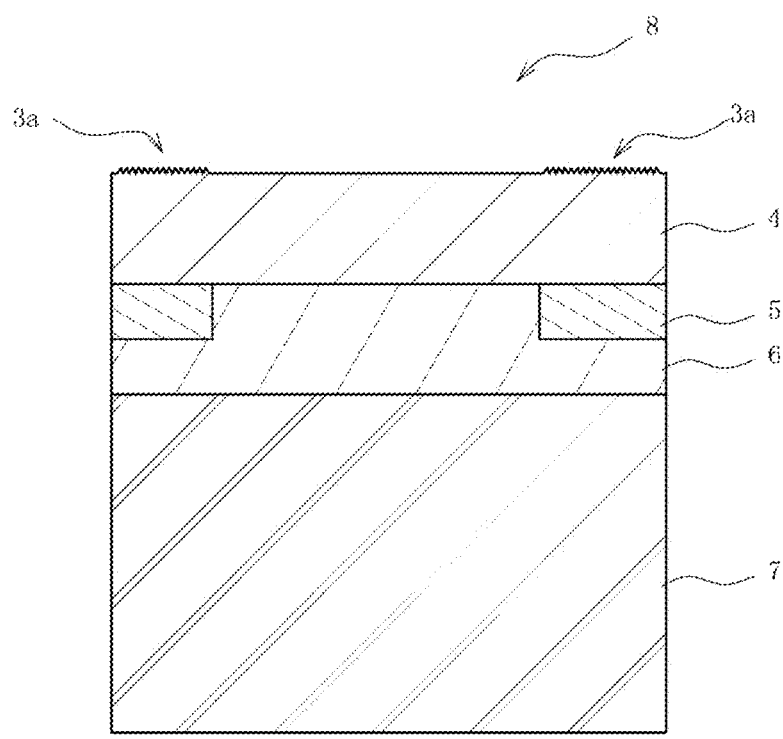
Figure 12:
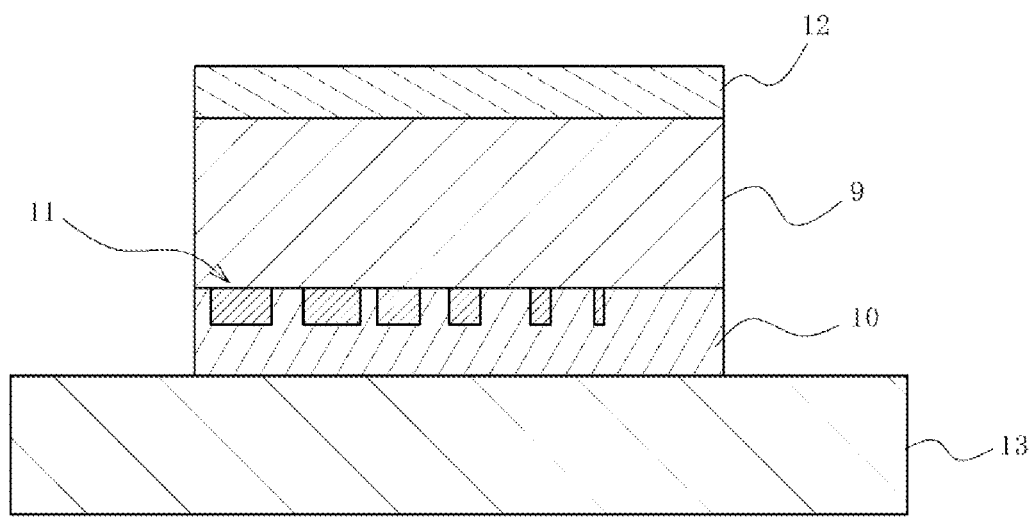
FIG. 12 is a schematic cross-sectional view illustrating a conventional technique.

At least one of the number of recessed portions 3b per unit area and the depth of the recessed portion 3b may change stepwise in a portion 1a to be transferred to a peripheral edge of the transfer target object 7 (see FIG. 10). The portion 1a indicated by a dot-dash line in FIG. 10(b) overlaps the peripheral edge of the transfer target object 7 and is transferred thereto. That is, a gradation can be applied around the decorative product 8 (see FIG. 11). In FIG. 11(a), the shaded portion is a portion with the gradation applied. In the portion to which the gradation is applied, the minute irregularities 3a are formed on the surface of the peeling layer 4, and at least one of the number of recessed portions per unit area and the depth of the recessed portion changes stepwise (see FIG. 11(b)). A range in which at least one of the number of recessed portions 3b per unit area and the depth of the recessed portion 3b changes stepwise can be, for example, not less than 2 mm and not greater than 15 mm.

Figure 8:
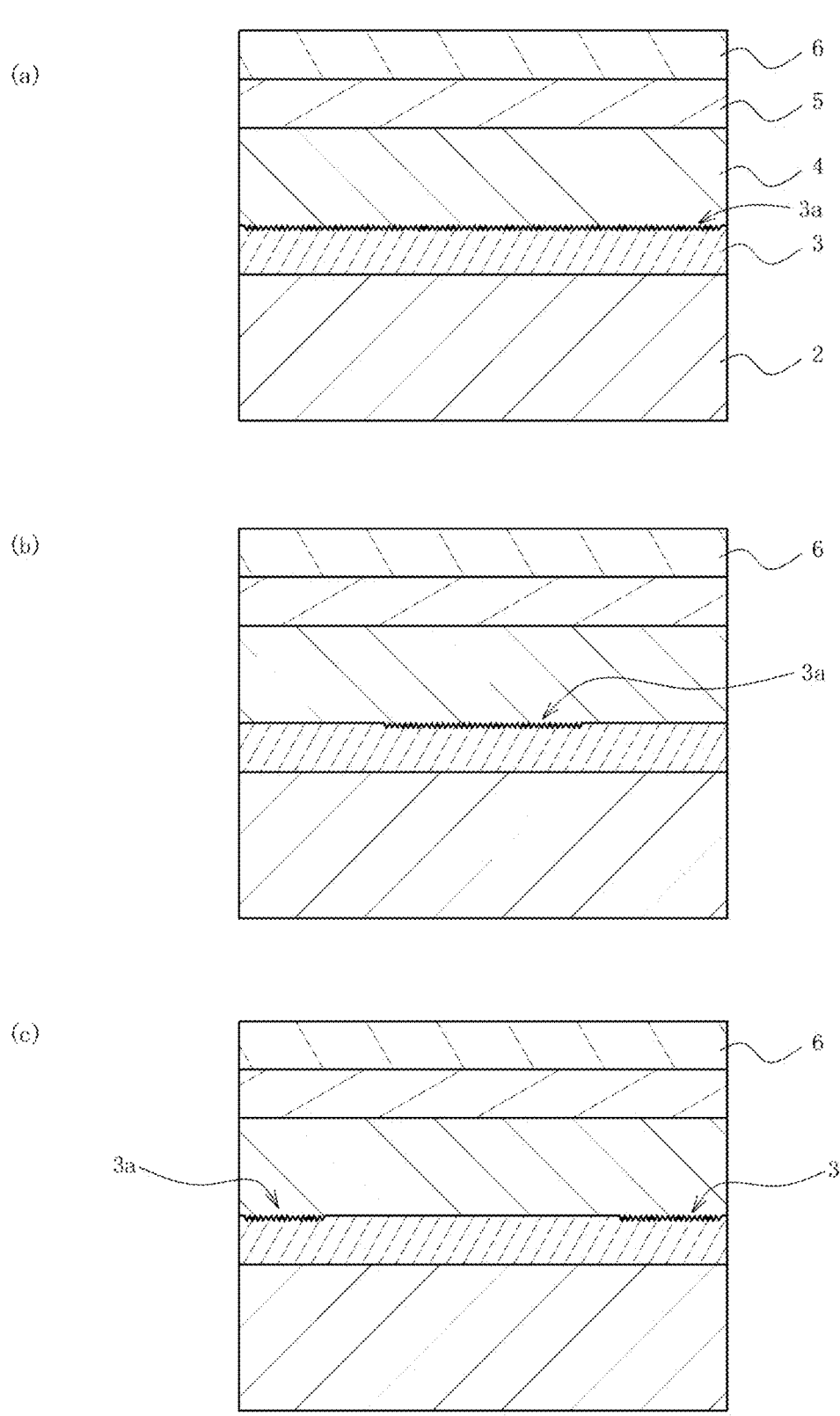
FIG. 8 includes schematic cross-sectional views illustrating another example of a transfer sheet of the present disclosure.

The transfer sheet 1 may further include an adhesive layer 6 laminated entirely on the solid print layer 5 (see FIG. 8). As a material for the adhesive layer 6, an acrylic-based resin, urethane-based resin, vinyl-based resin, vinyl chloride acetate resin, epoxy-based resin, polyester-based resin, a composite material of these resins, or the like may be used. A pressure-sensitive or thermally sensitive adhesive layer may be used as the adhesive layer. The adhesive layer 6 may be formed with an ink-like material transformed from the above-described material, by using a printing method such as screen printing, or may be formed by laminating an adhesive film containing the above-described material on the solid print layer 5. The transfer layer including the peeling layer 4 and the solid print layer 5 can be more reliably transferred to the transfer target object due to the adhesive layer 6.

A known method may be used as a method of transferring the transfer sheet 1 to the transfer target object 7 to obtain the decorative product 8. For example, a thermal transfer method in which the transfer sheet 1 is laid on the transfer target object 7, and then the transfer is carried out by applying heat and pressure, and a simultaneous molding and transferring method in which the transfer sheet 1 is arranged between a pair of molds, and then the transfer is carried out at the same time when injection molding is carried out, may be cited.

BRIEF DESCRIPTION OF THE REFERENCE NUMERALS

1: Transfer sheet
1a: Portion to be transferred to peripheral edge of transfer target object
2: Base sheet
3: Releasable layer
3a: Minute irregularities
3b: Recessed portion
3c: Projected portion
3d: Resin
4: Peeling layer
5: Solid print layer
6: Adhesive layer
7: Transfer target object
8: Decorative product
9: Label base substrate
10: Adhesive agent layer
11: Gradation print layer
12: Light transmitting solid print layer
13: Mount
14: Stamper
15: Metal plate

The invention claimed is:

1. A transfer sheet, comprising:
a base sheet;
a releasable layer laminated on the base sheet, containing an ultraviolet curing resin, and including minute irregularities on at least part of a surface opposite to a surface in contact with the base sheet;
a peeling layer laminated entirely on the releasable layer; and
a single color solid print layer laminated in a section on the peeling layer corresponding at least to a region where the minute irregularities of the releasable layer are formed,
wherein in a case that a maximum width of a recessed portion among recessed portions of the minute irregularities is taken as W, and a depth of the recessed portion of the minute irregularities is taken as D, relations (1) and (2) given below are satisfied, $$10 \leq W/D \leq 50 \qquad (1)$$

$$W \leq 100 \ \mu m, 2 \ \mu m \leq D \leq 10 \ \mu m \qquad (2), \text{and}$$

at least one of a number of the recessed portions per unit area and the depth of the recessed portion changes stepwise.

2. The transfer sheet according to claim 1,
wherein at least one of the number of the recessed portions per unit area and the depth of the recessed portion changes stepwise in a portion to be transferred to a peripheral edge of a transfer target object.

3. The transfer sheet according to claim 1, further comprising:
an adhesive layer laminated entirely on the solid print layer.

4. The transfer sheet according to claim 2, further comprising:
an adhesive layer laminated entirely on the solid print layer.

5. A decorative product, comprising:
a transfer target object;
a single color solid print layer formed in a predetermined region on the transfer target object; and
a peeling layer formed on the solid print layer and including minute irregularities in a section corresponding to the region where the solid print layer is formed,
wherein in a case that a maximum width of a projected portion among projected portions of the minute irregularities is taken as W, and a height of the projected portion of the minute irregularities is taken as H, relations (1) and (2) given below are satisfied, $$10 \leq W/H \leq 50 \qquad (1)$$

$$W \leq 100 \ \mu m, 2 \ \mu m \leq H \leq 10 \ \mu m \qquad (2), \text{and}$$

at least one of a number of the projected portions per unit area and the height of the projected portion changes stepwise.

6. The decorative product according to claim 5,
wherein at least one of density of the projected portions and a depth of the projected portion changes stepwise in a peripheral edge portion of the transfer target object.

7. The decorative product according to claim 6, further comprising:
an adhesive layer formed between the transfer target object and the solid print layer.

* * * * *